US009505935B2

(12) United States Patent
Kanto et al.

(10) Patent No.: US 9,505,935 B2
(45) Date of Patent: Nov. 29, 2016

(54) ANTISTATIC RELEASE AGENT, ANTISTATIC RELEASE COATED FILM AND ANTISTATIC RELEASE BASE MATERIAL

(71) Applicant: Shin-Etsu Polymer Co., Ltd., Tokyo (JP)

(72) Inventors: Kouhei Kanto, Saitama (JP); Sou Matsubayashi, Saitama (JP); Kenichi Fujitsuna, Kasukabe (JP); Kazuyoshi Yoshida, Kazo (JP)

(73) Assignee: SHIN-ETSU POLYMER CO., LTD. (JP)

( * ) Notice: Subject to any disclaimer, the term of this patent is extended or adjusted under 35 U.S.C. 154(b) by 67 days.

(21) Appl. No.: 14/032,304

(22) Filed: Sep. 20, 2013

(65) Prior Publication Data

US 2014/0084225 A1  Mar. 27, 2014

(30) Foreign Application Priority Data

Sep. 27, 2012  (JP) ................ 2012-213704

(51) Int. Cl.
*H01B 1/12* (2006.01)
*C09D 5/24* (2006.01)

(52) U.S. Cl.
CPC ............... *C09D 5/24* (2013.01); *H01B 1/121* (2013.01)

(58) Field of Classification Search
CPC .................................................. H01B 1/121
USPC ........................................................ 252/500
See application file for complete search history.

(56) References Cited

U.S. PATENT DOCUMENTS

2006/0076557 A1* 4/2006 Waller et al. ............ 257/40

FOREIGN PATENT DOCUMENTS

| CN | 101921478 A | 12/2010 |
|---|---|---|
| JP | 2636968 | 8/1997 |
| JP | 2002-241613 | 8/2002 |
| JP | 2003-251756 | 9/2003 |
| JP | 2009-138101 | 6/2009 |
| KR | 10-2008-0095907 | 10/2008 |

(Continued)

OTHER PUBLICATIONS

Taiwan Examination Report from the Intellectual Property Office dated Oct. 27, 2014 in corresponding Taiwan Application No. 102134475 with English language translation (8 pages).

(Continued)

*Primary Examiner* — Harold Pyon
*Assistant Examiner* — William Young
(74) *Attorney, Agent, or Firm* — Ostrolenk Faber LLP

(57) ABSTRACT

The present invention relates to an antistatic release agent comprising an aqueous solution of an electrically conductive polymer complex composed of a π-conjugated electrically conductive polymer and a polyanion having an anionic group in a molecule thereof, an alkaline compound, a silicone emulsion and a dispersion medium, wherein the alkaline compound is at least one type of compound selected from the group consisting of an inorganic alkali, as amine compound and a nitrogen-containing aromatic cyclic compound, the content of the alkaline compound in the antistatic release agent is 0.7 times or more relative to the number of moles of the neutralization equivalent of the electrically conductive polymer complex, and the pH of the antistatic release agent at 25° C. is 10 or lower. The present invention can provide an antistatic release agent having superior storage stability for forming an antistatic release coated film.

6 Claims, 1 Drawing Sheet

(56) References Cited

FOREIGN PATENT DOCUMENTS

| KR | 10-0910435 | 8/2009 |
|----|------------|--------|
| TW | 201000544 A | 1/2010 |
| TW | 201233759 A | 8/2012 |

OTHER PUBLICATIONS

Chinese Office Action, dated Jul. 9, 2015, issued in corresponding Chinese Patent Application No. 201310447651.0. Including English translation. Total 14 pages.

\* cited by examiner

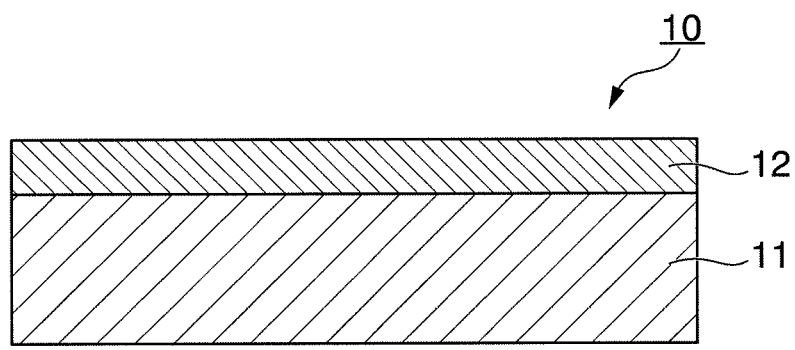

ANTISTATIC RELEASE AGENT, ANTISTATIC RELEASE COATED FILM AND ANTISTATIC RELEASE BASE MATERIAL

TECHNICAL FIELD

The present invention relates to an antistatic release agent, antistatic release coated film and antistatic release base material.

BACKGROUND ART

Base materials in which a silicone-based release agent is coated onto the surface of a base material such as a plastic film or paper are widely used as release base materials.

However, the aforementioned base materials are easily charged, and tend to become even more easily charged when coated with a silicone-based release agent. Consequently, there has been a need to impart antistatic properties to these release base materials.

Although ionic conductive compounds such as surfactants have been widely used in the past as antistatic agents, since the conductivity of ionic conductive compounds is dependent on humidity, the antistatic properties thereof are unstable, while also having the problem of bleeding out from release base materials. Therefore, it is known to use π-conjugated electrically conductive polymers, in which electrical conductivity is not dependent on humidity and which do not cause bleed-out, as antistatic agents for imparting antistatic properties to release base materials.

π-conjugated electrically conductive polymers are substances that are insoluble and infusible, and cannot be applied to coating or extrusion lamination. Therefore, Patent Document 1 discloses a liquid dispersion of a π-conjugated electrically conductive polymer in which a polyanion is added as a combination dopant and surfactant.

However, higher definition levels have come to be required by displays in recent years, and further improvement of mounting speed has come to be required in the field of component mounting in particular. Consequently, there is a growing need for protective films used in optical applications and antistatic base materials used for electronic and electrical components.

In response to these needs, Patent Document 2 proposes a release base material that uses an addition curing-type silicone emulsion and a release agent containing a thiophene-based electrically conductive polymer. However, the release agent described in Patent Document 2 has low storage stability when stored in the form of an aqueous solution, resulting in the problem of it gelling in 2 to 3 days so that it can no longer be used. In addition, even if a coated film was attempted to be formed by forcibly coating the gelled release agent onto a base material, desired antistatic properties and release property were unable to be obtained.

PRIOR ART DOCUMENTS

Patent Documents

[Patent Document 1] Japanese Patent Publication No. 2636968
[Patent Document 2] Japanese Unexamined Patent Application, First Publication No. 2002-241613

DISCLOSURE OF THE INVENTION

Problems to be Solved by the Invention

An object of the present invention is to provide an antistatic release agent having superior storage stability for forming an antistatic release coated film. In addition, an object of the present invention is to provide an antistatic release coated film having superior antistatic properties and release property, and an antistatic release base material provided with the aforementioned coated film.

Means for Solving the Problems

The present invention has the modes indicated below.

[1] An antistatic release agent containing an aqueous solution of an electrically conductive polymer complex composed of a π-conjugated electrically conductive polymer and a polyanion having an anionic group in a molecule thereof, an alkaline compound, a silicone emulsion and a dispersion medium, wherein the alkaline compound is one or more types selected from the group consisting of an inorganic alkali, an amine compound and a nitrogen-containing aromatic cyclic compound, the content of the alkaline compound is 0.7 times or more relative to the number of moles of the neutralization equivalent of the electrically conductive polymer complex, and the pH at 25° C. is 10 or lower.

[2] The antistatic release agent described in [1], wherein the silicone emulsion contains an addition reaction-type silicone resin.

[3] An antistatic release coated film formed by coating the antistatic release agent described in [1] or [2].

[4] An antistatic release base material provided with a base material and the antistatic release coated film described in [3] arranged on at least one side of the base material.

In addition, the present invention has the aspects indicated below.

<1> An antistatic release agent, comprising: an aqueous solution of an electrically conductive polymer complex composed of a π-conjugated electrically conductive polymer and a polyanion having an anionic group in a molecule thereof, an alkaline compound, a silicone emulsion and a dispersion medium; wherein, the alkaline compound is at least one compound selected from the group consisting of an inorganic alkali, an amine compound and a nitrogen-containing aromatic cyclic compound, the content of the alkaline compound in the antistatic release agent is 0.7 times or more relative to the number of moles of the neutralization equivalent of the electrically conductive polymer complex, and the pH of the antistatic release agent at 25° C. is 10 or lower;

<2> the antistatic release agent described in <1>, wherein the silicone emulsion contains an addition reaction-type silicone resin;

<3> an antistatic release coated film formed by coating the antistatic release agent described in <1> or <2>, <4> an antistatic release base material having a base material and the antistatic release coated film described in <3>, wherein the antistatic release coated film is laminated on the base material;

<5> the antistatic release agent described in any of <1> to <4>, wherein the alkaline compound is at least one type of inorganic alkali selected from the group consisting of sodium hydroxide, potassium hydroxide, calcium hydroxide, ammonia, sodium bicarbonate, potassium bicarbonate and ammonium bicarbonate; and, <6> the antistatic release agent described in any of <1> to <5>, wherein the dispersion medium is a mixture with water and at least one type of the compound selected from the group consisting of methanol, ethanol, propanol, and dimethylsulfoxide.

Effects of the Invention

The antistatic release agent of the present invention has superior storage stability.

The antistatic release coated film and antistatic release base material of the present invention have superior antistatic properties and release property.

BRIEF DESCRIPTION OF THE DRAWINGS

FIG. 1 is a cross-sectional view showing an example of the antistatic release base material of the present invention.

BEST MODE FOR CARRYING OUT THE INVENTION

The following provides a detailed explanation of the present invention.

Furthermore, in the present description, "electrical conductivity" refers to a surface resistance value of $10^{10}\Omega$/sq. or less. In addition, having "superior electrical conductivity" refers to having a surface resistance value of $10^4\Omega$/sq. to $10^9\Omega$/sq.

<Antistatic Release Agent>

In one mode of the present invention, an antistatic release agent comprises an aqueous solution of an electrically conductive polymer complex composed of a π-conjugated electrically conductive polymer and a polyanion having an anionic group in a molecule thereof, an alkaline compound, a silicone emulsion and a dispersion medium, wherein the alkaline compound is at least one type of compound selected from the group consisting of an inorganic alkali, an amine compound and a nitrogen-containing aromatic cyclic compound, the content of the alkaline compound in the antistatic release agent is 0.7 times or more relative to the number of moles of the neutralization equivalent of the electrically conductive polymer complex, and the pH at 25° C. is 10 or lower. The following provides an explanation of the antistatic release agent of the present invention.

(Aqueous Solution of Electrically Conductive Polymer Complex)

In a first mode of the present invention, an "aqueous solution of an electrically conductive polymer complex" refers to aqueous dispersion of an electrically conductive polymer complex composed of a π-conjugated electrically conductive polymer and a polyanion having an anionic group in a molecule thereof.

In addition, in a first mode of the present invention, the amount of an electrically conductive polymer complex in an aqueous solution of an electrically conductive polymer complex is preferably 0.1 to 20% by mass, more preferably 0.5 to 10% by mass and particularly preferably 0.6 to 3% by mass.

(π-Conjugated Electrically Conductive Polymer)

There are no particular limitations on the π-conjugated electrically conductive polymer provided the effects of the present invention are demonstrated, is an organic polymer in which the main chain is composed with a π-conjugated system, and examples thereof include polypyrroles, polythiophenes, polyacetylenes, polyphenylenes, polyphenylenevinylenes, polyanilines, polyacenes, polythiophenevinylenes, and copolymers thereof. Polypyrroles, polythiophenes and polyanilines are preferable from the viewpoint of stability in air. Polythiophenes are more preferable from the viewpoints of compatibility with polar solvents of the electrically conductive polymer complex comprising the π-conjugated electrically conductive polymer and transparency of the antistatic release base material. Here, "main chain" refers to the main carbon chain of a chain compound, and in the present description, refers to the trunk portion having the largest number of carbon atoms in the π-conjugated electrically conductive polymer.

In a first mode of the present invention, an "π-conjugated electrically conductive polymer" refers to an organic polymer that is 2 or more the number of the repeating unit of monomer (i.e. polymerization degree) having π-conjugated system in a structure thereof.

Although the π-conjugated electrically conductive polymer allows the obtaining of adequate electrical conductivity and transparency even if unsubstituted, in order to further enhance electrical conductivity and transparency, a function group such as a linear or branched alkyl group having 1 to 12 carbon atoms, carboxyl group, sulfo group, alkoxy group having 1 to 12 carbon atoms or hydroxyl group may be introduced into the π-conjugated electrically conductive polymer.

Specific examples of π-conjugated electrically conductive polymers include polythiophenes such as polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene) or poly(3-methyl-4-carboxybutylthiophene). Examples of polypyrroles include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of polyanilines include polyaniline, poly(2-methylaniline), poly(3-isobutylaniline), poly(2-aniline sulfonic acid) and poly(3-aniline sulfonic acid).

Among the aforementioned π-conjugated electrically conductive polymers, poly(3,4-ethylenedioxythiophene) is particularly preferable from the viewpoints of electrical conductivity, transparency and heat resistance.

(Polyanion)

The polyanion refers to a polymer having a structural unit having an ionic group (to also be referred to as a "monomer unit") in a molecule thereof. In addition, in one mode of the present invention, the polyanion is preferably a polymer having 2 or more of the aforementioned anionic groups in a molecule thereof. The anionic group of this polyanion functions as a dopant for the π-conjugated electrically conductive polymer, and improves the electrical conductivity of the π-conjugated electrically conductive polymer.

In one mode of the present invention, the anionic group of the polyanion is preferably a sulfo group or carboxyl group. In addition, the polyanion is preferably a polymer obtained by copolymerizing a monomer unit having the aforementioned sulfo group or carboxyl group.

Specific examples of this polyanion include polymers having a sulfonate group such as polystyrene sulfonate, polyvinylsulfonate, polyallylsulfonate, polyacrylsulfonate, polymethacrylsulfonate, poly(2-acrylamide-2-methylpropanesulfonate), polyisoprene sulfonate, polysulfoethyl methacrylate, poly(4-sulfobutylmethacrylate) or polymethacryloxybenzene sulfonate, and polymers having a carboxylate group such as polyvinyl carboxylate, polystyrene carboxylate, polyallylcarboxylate, polyacrylcarboxylate, polymethacrylcarboxylate, poly(2-acrylamide-2-methylpropanecarboxylate), polyisoprene carboxylate or polyacrylic acid. These may be homopolymers or copolymers of two or more types thereof.

Among these polyanions, polymers having a sulfonate group are preferable from the viewpoint of antistatic properties. Among these, polystyrene sulfonate is particularly preferable.

The degree of polymerization of the polyanion is preferably such that the number of monomer units is within the range of 10 to 100,000, and more preferably within the range of 50 to 10,000, from the viewpoints of dispersibility and electrical conductivity. Namely, the polyanion is a polymer in which the number of monomer units is within the range of 10 to 100,000 and preferably within the range of 50 to 10,000.

The weight average molecular weight of the polyanion is preferably 20,000 to 1,000,000 and more preferably 100,000 to 500,000. If the weight average molecular weight of the polyanion is equal to or greater than the aforementioned lower limit, namely 20,000 or more, an antistatic release agent containing aπ-conjugated electrically conductive polymer can be made into a uniform release agent, while if the weight average molecular weight is equal to or less than the aforementioned upper limit, namely 1,000,000 or less, sufficiently high electrical conductivity can be obtained.

The content of the polyanion in the electrically conductive polymer complex is preferably within the range of 0.1 moles to 10 moles, and more preferably within the range of 1 mole to 7 moles, based on 1 mole of the π-conjugated electrically conductive polymer. If the content of the polyanion is less than the aforementioned lower limit value, namely less than 0.1 moles, the doping effect on the π-conjugated electrically conductive polymer tends to weaken, thereby resulting in a shortage of electrical conductivity. Moreover, since dispersibility and solubility of the electrically conductive polymer complex obtained by doping the aforementioned polyanion become low, it becomes difficult to obtain a uniform aqueous solution. In addition, if the content of the polyanion exceeds the aforementioned upper limit value, namely exceeds 10 moles, the content of the π-conjugated electrically conductive polymer decreases, thereby making it difficult to obtain adequate electrical conductivity.

Namely, if the content of the polyanion in an aqueous solution of the electrically conductive polymer complex is within the range of 0.1 moles to 10 moles based on 1 mole of the π-conjugated electrically conductive polymer, it demonstrates adequate doping effects on the π-conjugated electrically conductive polymer, has adequate electrical conductivity, and does not undergo a decrease in dispersibility or solubility of the electrically conductive polymer complex, thereby making this preferable.

The polyanion is able to coordinate with the π-conjugated electrically conductive polymer. Consequently, the π-conjugated electrically conductive polymer and the polyanion form an electrically conductive complex in an aqueous solution.

However, not all anionic groups in the polyanion dope the π-conjugated electrically conductive polymer, and surplus anionic groups are present. Since these surplus anionic groups are hydrophilic groups, they fulfill the role of improving water dispersibility of the aforementioned complex.

<Preparation Method of Aqueous Solution of Electrically Conductive Complex>

In one mode of the present invention, the aqueous solution of the electrically conductive complex can be prepared by a method comprising a step (I) for obtaining a reaction solution which was doped polyanion to a π-conjugated electrically conductive polymer by mixing and stirring a monomer having a π-conjugated system in a structure thereof, polyanion and water, and a step (II) for filtering the reaction mixture obtained in step (I).

In step (I), the amount of polyanion used to dope the π-conjugated electrically conductive polymer is preferably 0.1 moles to 10 moles and more preferably 1 mole to 7 moles based on 1 mole of the π-conjugated electrically conductive polymer as was previously described.

The aforementioned step (I) is preferably carried out at a temperature of 5° C. to 20° C. and more preferably at a temperature of 5° C. to 10° C.

In addition, the duration of mixing and stirring is preferably 0.5 to 2 hours and more preferably 0.5 to 1 hour.

In addition, tap water or ion exchange water can be used for the aforementioned water. Among these, ion exchange water is used preferably from the viewpoint of impurity ion.

Moreover, in one mode of the present invention, the aforementioned step (I) is preferably carried out in the presence of an oxidation catalyst.

Examples of oxidation catalysts that can be used include hydrogen peroxide, ammonium persulfate and ferric sulfate. One type of these may be used alone or two or more types may be used in combination. Among these, ammonium persulfate and ferric sulfate are preferable from the viewpoint of electrical conductivity.

The amount of oxidation catalyst is preferably 0.5 to 2 molar equivalents and more preferably 1 to 1.5 molar equivalents, relative to 1 mol of the monomer having a π-conjugated system in a structure thereof.

An aqueous solution of an electrically conductive complex can be prepared by further purifying the reaction mixture obtained in the aforementioned step (I) (hereinafter step (II)).

In step (II), ion-exchanging method using an ion-exchange resin or ultrafiltration is preferably used to purify the reaction mixture. Among these, ultrafiltration is used preferably from the viewpoint of reducing time. In addition, the aforementioned step (II) is preferably repeated 5 to 20 times and more preferably repeated 10 to 20 times from the view point of purity.

(Alkaline Compound)

In one mode of the present invention, one or more types of compounds selected from the group consisting of an inorganic alkali, an amine compound and a nitrogen-containing aromatic cyclic compound is used for the alkaline compound contained in the antistatic release agent.

Examples of amine compounds include primary amines, secondary amines, tertiary amines and quaternary ammonium salts, and the aforementioned amines preferably have a substituent selected from a linear or branched alkyl group having 2 to 12 carbon atoms, aryl group having 6 to 12 carbon atoms, aralkyl group having 7 to 12 carbon atoms, alkylene group having 2 to 12 carbon atoms, arylene group having 6 to 12 carbon atoms, aralkylene group having 7 to 12 carbon atoms, and oxyalkylene group having 2 to 12 carbon atoms.

Among the aforementioned amine compounds, examples of primary amines include aniline, toluidine, benzylamine and ethanolamine.

Among the amine compounds, examples of secondary amines include diethanolamine, dimethylamine, diethylamine, dipropylamine, diphenylamine, dibenzylamine and dinaphthylamine.

Among the amine compounds, examples of tertiary amines include triethanolamine, trimethylamine, triethylamine, tripropylamine, tributylamine, triphenylamine, tribenzylamine and trinaphthylamine.

Among the amine compounds, examples of quaternary ammonium salts include tetramethylammonium salts, tetraethylammonium salts, tetrapropylammonium salts, tetraphenylammonium salts, tetrabenzylammonium salts and tetranaphthylammonium salts. Examples of anions paired with the ammonium ion include hydroxide ions.

Among these, tertiary amines are preferable, and trimethylamine, triethylamine, tripropylamine, or tributylamine is more preferable.

In addition, examples of inorganic alkalis include sodium hydroxide, potassium hydroxide, calcium hydroxide, ammonia, sodium bicarbonate, potassium bicarbonate and ammonium bicarbonate. These inorganic alkalis are preferably used in the form of an aqueous solution. In addition, the concentration of inorganic alkali in the aforementioned aqueous solution is preferably 0.1% by weight to 10% by weight and more preferably 0.1% by weight to 3% by weight based on the total weight of the aqueous solution. In addition, the case for using ammonia as the inorganic alkali, the concentration of ammonia in an aqueous solution thereof is preferably 2% by weight to 30% by weight and more preferably 4% by weight to 28% by weight. In addition, in one mode of the present invention, in the case a silicone emulsion to be subsequently described is an addition reaction-type silicone emulsion, these inorganic alkalis are preferably used for the alkaline compound. This is because the aforementioned amine compounds in the form of aliphatic amines and aromatic amines are catalytically poisonous to the platinum catalyst of addition reaction-type silicone emulsions, thereby resulting in inadequate curing of a coated film.

Examples of amine compounds in the case of having an oxyalkylene group include compounds represented by the following chemical formulas I and II:

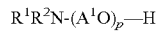

$$R^1R^2N\text{-}(A^1O)_p\text{---}H \qquad \text{Chemical formula I}$$

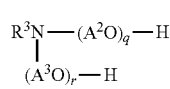

$$R^3N\text{---}(A^2O)_q\text{---}H$$
$$\quad\;\,|$$
$$(A^3O)_r\text{---}H \qquad \text{Chemical formula II}$$

(wherein, $R^1$, $R^2$ and $R^3$ respectively and independently represent an alkyl group (such as a methyl group, ethyl group, propyl group or butyl group) having 1 to 24 carbon atoms, $A^1O$, $A^2O$ and $A^3O$ respectively and independently represent an oxyalkylene group having 2 to 4 carbon atoms or a mixture thereof, and p, q and r respectively and independently represent $1 \le p, q, r \le 100$.

More specifically, compounds can be selected from each of the product series of Ionet (trade name, Sanyo Chemical Industries, Ltd.), Nymeen (trade name, NOF Corp.), or Ethomeen (trade name, Lion Akzo Co., Ltd.) and the like.

The nitrogen-containing aromatic cyclic compound refers to a compound that has an aromatic ring containing at least one nitrogen atom, and the aforementioned nitrogen atom may be contained in the aromatic ring in the form of a secondary amine, tertiary amine or quaternary ammonium salt.

Specific examples of nitrogen-containing aromatic cyclic compounds include pyrrole, imidazole, 2-methylimidazole, 2-propylimidazole, 2-undecylimidazole, 2-phenylimidazole, N-methylimidazole, 1-(2-hydroxyethyl)imidazole, 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazole dicarboxylate, dimethyl 4,5-imidazole dicarboxylate, benzimidazole, 2-aminobenzimidazole, 2-aminobenzimidazole-2-sulfonate, 2-amino-1-methylbenzimidazole, 2-hydroxybenzimidazole, 2-(2-pyridyl)benzimidazole, 1-ethyl-3-methylimidazolium hydroxide and pyridine. Among these, imidazole, 2-methylimidazole, 2-propylimidazole and pyridine are preferable.

In addition, these nitrogen-containing aromatic cyclic compounds are preferably used in the form of an aqueous solution, and the concentration of the aforementioned nitrogen-containing aromatic cyclic compound in the aqueous solution is preferably 0.1% by weight to 10% by weight, and more preferably 0.1% by weight to 3% by weight, based on the total weight of the aqueous solution.

In one mode of the present invention, solubility in water of the aforementioned alkaline compound is preferably 0.1 (g/100 ml (10° C.)) or more. If the solubility in water is 0.1 (g/100 ml (10° C.)) or more, the alkaline compound easily dissolves in the dispersion medium, thereby making it possible to further improve the storage stability of the antistatic release agent. In addition, although there are no particular limitations on the upper limit of the aforementioned solubility provided the effects of the present invention are demonstrated, it is preferably 5 (g/100 ml (10° C.)) or less.

Thus, preferable examples of the aforementioned alkaline compound include inorganic alkalis such as sodium hydroxide, potassium hydroxide, calcium hydroxide, ammonia, sodium bicarbonate, potassium bicarbonate or ammonium bicarbonate, amine compounds such as aniline, toluidine, benzylamine, ethanolamine, diethanolamine, dimethylamine, diethylamine, dipropylamine, triethanolamine, trimethylamine, triethylamine or tripropylamine, quaternary ammonium salts such as tetramethylammonium salts, tetraethylammonium salts, tetrapropylammonium salts, tetraphenylammonium salts, tetrabenzylammonium salts, tetranaphthylammonium salts or 1-ethyl-3-methylimidazolium hydroxide, amine compounds having an oxyalkylene group, and nitrogen-containing aromatic cyclic compounds such as imidazole, 2-methylimidazole, 2-propylimidazole, 1-(2-hydroxyethyl)imidazole, 2-ethyl-4-methylimidazole, 1,2-dimethylimidazole, 1-cyanoethyl-2-methylimidazole, 1-cyanoethyl-2-ethyl-4-methylimidazole, 2-aminobenzimidazole or pyridine. In addition, among these, potassium bicarbonate, potassium hydroxide, sodium hydroxide, sodium bicarbonate, ammonia, imidazole and triethylamine are more preferable, while sodium hydroxide, sodium bicarbonate, ammonia, imidazole and triethylamine are particularly preferable.

The content of the alkaline compound in the antistatic release agent is preferably 0.7 times or more, and more preferably 0.9 times or more, relative to the number of moles of the amount added at the inflection point of a neutralization titration curve obtained by neutralizing the electrically conductive polymer complex with the alkaline compound used by titration, or in other words, the number of moles of the neutralization equivalent. If the content of the alkaline compound is less than 0.7 times relative to the number of moles of the neutralization equivalent, storage stability of the antistatic release agent decreases. In addition, although there are no particular limitations on the upper limit value of the content of the alkaline compound provided it is within a range such that the pH of the aforementioned antistatic release agent does not exceed 10, in general, the content of the alkaline compound is preferably 1.5 times or less, and more preferably 1.2 times or less, relative to the number of moles of the neutralization equivalent of the electrically conductive polymer complex. Namely, the content of the alkaline compound in the antistatic release agent is preferably 0.7 times to 1.5 times, and more preferably 0.9 times to 1.2 times relative to the number of moles of the neutralization equivalent of the electrically conductive polymer complex.

In addition, the pH of the antistatic release agent at 25° C. is 10 or lower as a result of containing the aforementioned alkaline compound. Namely, even if the pH value is outside the range defined in the present description, it is still included in the range of the present invention provided it is the pH value defined in the present description when corrected to the pH value at 25° C.

In addition, the pH (25° C.) of the aforementioned antistatic release agent is preferably 9 or lower. If the pH exceeds 10, storage stability of the antistatic release agent extremely decreases. In addition, the lower limit value of the pH (25° C.) of the antistatic release agent is preferably 3 or higher, and more preferably 5 or higher. Namely, in one mode of the present invention, the pH (25° C.) of the antistatic release agent is preferably 3 to 10 and more preferably 5 to 9.

In addition, the pH of the antistatic release agent refers to the value obtained by measuring using a pH meter. In addition, the aforementioned pH meter is preferably calibrated using a phthalic acid pH standard solution having a pH of 4.01, a neutral phosphate pH standard solution having a pH of 6.86, and a borate pH standard solution having a pH of 9.18.

(Silicone Emulsion)

The silicone emulsion used in the present invention refers to an emulsification product obtained by emulsifying a curable silicone resin having separation ability in an aqueous dispersion medium.

The aforementioned silicone emulsion is obtained by preparing in accordance with a known emulsion polymerization method when polymerizing the aforementioned curable silicone resin.

Emulsion polymerization conditions can be suitably determined corresponding to the types of raw materials used, the properties of the emulsion and the like.

Examples of curable silicone resins able to be applied to emulsion polymerization include condensation reaction-type and addition reaction-type resins, and each of these may be used alone or two or more types may be used in combination. These curable silicone resins are normally used in combination with a curing agent.

Examples of condensation reaction-type silicone resins able to be applied to emulsion polymerization include those in which a three-dimensional crosslinked structure has been formed by a condensation reaction using polydimethylsiloxane having hydroxyl groups (—OH) on both ends of a linear chain in a linear polymer composed of siloxane bonds, polydimethylsiloxane having hydrogen atoms (—H) on both ends of the linear chain in a linear polymer composed of siloxane bonds, and a curing agent (organic tin catalyst (such as an organic tin acylate catalyst)).

In the present description, a "condensation reaction-type silicone resin" refers to a silicone resin of a type in which curing proceeds by reacting with moisture in the air.

Specific examples of condensation reaction-type silicone resins include X-52-195 and X-52-170 (trade name, manufactured by Shin-Etsu Chemical Co., Ltd.). In addition, specific examples of organic tin catalysts include CAT-PL10 (trade name, manufactured by Shin-Etsu Chemical Co., Ltd.).

Examples of addition reaction-type silicone resins able to be applied to emulsion polymerization include those in which a three-dimensional crosslinked structure has been formed by reacting hydrogen silane with polydimethylsiloxane, into which vinyl groups have been introduced on both ends of a linear chain in a linear polymer composed of siloxane bonds, using a curing agent (platinum-based catalyst). Here, an "addition reaction-type silicone resin" refers to a silicone resin of the type in which the curing reaction proceeds as a result of heating.

Specific examples of addition reaction-type silicone resins include KM-3951, X-52-151, X-52-6068, and X-52-6069 (trade name, manufactured by Shin-Etsu Chemical Co., Ltd.). In addition, specific examples of platinum-based catalysts include CAT-PM-10 (trade name, manufactured by Shin-Etsu Chemical Co., Ltd.).

Among these curable silicone resins, the use of an addition reaction-type silicone resin that uses a platinum-based catalyst for the curing agent is preferable from the viewpoints of residual adhesive rate and the burden on the environment.

Furthermore, in the present invention, the curing agent used for the silicone emulsion varies corresponding to the type of curable silicone resin used. As was previously described, an organic tin catalyst is used as a curing agent in the case of a condensation reaction-type silicone resin, while a platinum-based catalyst is used as curing agent in the case of an addition reaction-type silicone resin.

The ratio between the silicone resin and electrically conductive polymer complex in the antistatic release agent is preferably such that the amount of the electrically conductive polymer complex is preferably 0.5% by weight to 100% by weight, and more preferably 1% by weight to 60% by weight, based on 100% by weight of the solid component of the silicone emulsion. Namely, the ratio between the silicone emulsion and electrically conductive polymer complex in the antistatic release agent is such that the content of the electrically conductive polymer complex is preferably within the range of 0.5% by weight to 100% by weight, more preferably within the range of 1% by weight to 60% by weight, and particularly preferably 1% by weight to 40% by weight, when the total weight of the solid component of the silicone emulsion in the antistatic release agent is assigned a value of 100% by weight. If the content of the electrically conductive polymer complex is equal to or greater than the aforementioned lower limit value, the antistatic release agent is able to demonstrate sufficiently high antistatic properties, while if the content is equal to or less than the aforementioned upper limit value, the antistatic release agent is able to demonstrate sufficiently high release property.

(Dispersion Medium)

In one mode of the present invention, although there are no particular limitations on the dispersion medium contained in the antistatic release agent provided the effects of the present invention are demonstrated, it preferably contains water from the viewpoint of being the most suitable for coexisting in the presence of the silicone emulsion, electrically conductive polymer complex and alkaline compound. Moreover, the content of water in the entire dispersion medium is preferably 50% by weight or more and more preferably 80% by weight or more. In addition, the upper limit value of the content of water in the dispersion medium is preferably 90% by weight or less and more preferably 70% by weight or less based on the total weight of the dispersion medium. Namely, water is preferably contained at 50% by weight to 90% by weight, and more preferably at 70% by weight to 80% by weight, based on the total weight of the dispersion medium.

Examples of aqueous solvents that can be mixed with water include solvents having a solubility parameter of 10 or more, specific examples of which include alcohols such as methanol, ethanol or isopropanol, polar solvents such as N-methyl-2-pyrrolidone, N-methylacetoamide, N,N-dimethylformamide, N,N-dimethylacetoamide, dimethylsulfoxide, hexamethylene phosphortriamide, N-vinylpyrrolidone, N-vinylformamide or N-vinylacetoamide, phenols such as cresol, phenol or xylenol, polyvalent aliphatic alcohols such as ethylene glycol, propylene glycol, dipropylene glycol, 1,3-butylene glycol, 1,4-butylene glycol, D-glucose, D-glucitol, isoprene glycol, butanediol, 1,5-pentanediol, 1,6-hexanediol, 1,9-nonanediol or neopentyl glycol, carbonate compounds such as ethylene carbonate or propylene carbonate, ether compounds such as dioxane or diethyl ether, chain-like ethers such as dialkyl ether, propylene glycol dialkyl ether, polyethylene glycol dialkyl ether or polypropylene glycol dialkyl ether, heterocyclic compounds such as 3-methyl-2-oxazolidinone, and nitrile compounds such as acetonitrile, glutaronitrile, methoxyacetonitrile, propionitrile or benzonitrile. These solvents may be used alone or two or more types may be used as a mixture. Among these solvents, a mixture of at least one compound selected from the group consisting of methanol, ethanol, isopropanol and dimethylsulfoxide and water is preferable, while a mixture of dimethylsulfoxide and water is particularly preferable, from the viewpoint of stability.

In addition, in one mode of the present invention, the content of dispersion medium in the antistatic release agent is preferably 50% by weight to 90% by weight, and more preferably 70% by weight to 90% by weight, based on the total weight of the antistatic release agent.

(Binder Resin and Additives)

A known binder resin, additive or electrical conductivity enhancer and the like may be contained in the antistatic release agent.

Examples of binder resins used include acrylic resin, polyester resin, polyurethane resin, polyimide resin, polyether resin and melamine resin. Binder resins facilitate mixing when added in the form of a water-soluble or water-dispersed emulsion.

There are no particular limitations on additives provided the effects of the present invention are demonstrated, and examples of additives that can be used include surfactants, inorganic conductive agents, antifoaming agents, coupling agents, antioxidants and ultraviolet absorbers.

Although examples of surfactants include nonionic surfactants, anionic surfactants and cationic surfactants, nonionic surfactants are preferable from the viewpoint of storage stability. In addition, polymer-based surfactants may also be added such as polyvinyl alcohol or polyvinyl pyrrolidine. These polymer-based surfactants are able to further improve storage stability of the antistatic release agent by acting as protective colloidal agents.

Examples of inorganic conductive agents include metal ions and electrically conductive carbon. Furthermore, metal ions can be formed by dissolving a metal salt in water.

Examples of antifoaming agents include silicone resin, and polydimethylsiloxane.

Examples of coupling agents include silane coupling agents having a vinyl group, amino group or epoxy group and the like.

Examples of antioxidants include phenol-based antioxidants, amine-based antioxidants, phosphorous-based antioxidants, sulfur-based antioxidants, sugars and vitamins.

Examples of ultraviolet absorbers include benzotriazole-based ultraviolet absorbers, benzophenone-based ultraviolet absorbers, salicylate-based ultraviolet absorbers, cyanoacrylate-based ultraviolet absorbers, oxanilide-based ultraviolet absorbers, hindered amine-based ultraviolet absorbers and benzoate-based ultraviolet absorbers.

Examples of conductivity enhancers able to improve the electrical conductivity of the π-conjugated electrically conductive polymer include high boiling point solvents such as N-methylpyrrolidone, dimethylsulfoxide or ethylene glycol, sugars and sugar derivatives.

<Production Method of Antistatic Release Agent>

In one mode of the present invention, the antistatic release agent can be prepared by adding an alkaline compound and a silicone emulsion to an aqueous solution of an electrically conductive polymer complex followed by mixing by stirring.

The temperature during stirring and mixing of each of these components is preferably 5° C. to 40° C. and more preferably 10° C. to 30° C.

(Operation and Effects)

The antistatic release agent of the present invention has high storage stability as a result of making the content of the aforementioned specific alkaline compound to be 0.7 times or more relative to the number of moles of the neutralization equivalent of the electrically conductive polymer complex, and by making the pH of the antistatic release agent to be 10 or lower. Consequently, the formation of contaminants and precipitates in the antistatic release agent is inhibited, thereby enabling stable coating.

In addition, in one aspect of the present invention, a composition containing an aqueous solution of an electrically conductive polymer complex composed of a π-conjugated electrically conductive polymer and polyanion having an anionic group in a molecule thereof, an alkaline compound, a silicone emulsion, a dispersion medium comprising water, is used as an antistatic release agent.

An antistatic release agent having the aforementioned composition is preferably used by comprising a step (A) for preparing an aqueous solution of an electrically conductive polymer which was doped the aforementioned polyanion to the aforementioned π-conjugated electrically conductive polymer, a step (B) for preparing an antistatic release agent by neutralizing the aqueous solution of the electrically conductive polymer complex obtained in step (A) with an alkaline compound followed by the addition of a silicone emulsion and dispersion medium comprising water, and a step (C) for coating the antistatic release agent obtained in step (B) onto a base material.

<Antistatic Release Coated Film>

The antistatic release coated film of the present invention refers to a coated film formed by coating the aforementioned antistatic release agent onto a base material.

Examples of methods applied to coat the antistatic release agent when forming the antistatic release coated film include comma coating, reverse coating, lip coating and micro gravure coating. Although there are no particular limitations on the amount of the aforementioned antistatic release agent coated onto the base material provided the effects of the present invention are demonstrated, it is normally within the range of 0.1 g/m² to 2.0 g/m² as the solid component thereof.

Curing treatment is preferably carried out after having coated the antistatic release agent. Heating is applied for the curing method. An ordinary method can be employed for the heating method, such as hot air heating or infrared heating. The aforementioned hot air heating is preferably carried out under conditions of a hot air temperature of 80° C. to 150° C. at an air blowing rate of 1 m/s to 20 m/s.

<Antistatic Release Base Material>

The antistatic release base material of the present invention is provided with a base material and the aforementioned antistatic release coated film laminated on the aforementioned base material. In addition, in one mode of the present invention, a plastic film or paper can be preferably used for the base material contained in the antistatic release base material. Namely, in the case of using a plastic film or paper for the aforementioned base material, the antistatic release base material of the present invention is preferably provided with a base material and an antistatic release coated film laminated on at least one side of the aforementioned base material.

FIG. 1 is a cross-sectional view showing an example of the antistatic release base material of the present invention. An antistatic release base material 10 of this example employs a configuration in which an antistatic release coated film 12 is laminated on a base material 11.

Furthermore, in FIG. 1, dimensional ratios differ from actual dimensional ratios to facilitate the explanation.

Examples of resin materials that compose the plastic film include polyethylene, polypropylene, polystyrene, polyvinyl chloride, polyvinyl alcohol, polyethylene terephthalate, polybutylene terephthalate, polyethylene naphthalate, polyacrylate, polycarbonate, polyvinylidene fluoride, polyarylate, styrene-based elastomer, polyester-based elastomer, polyethersulfone, polyetherimide, polyether ether ketone, polyphenylenesulfide, polyimide, cellulose triacetate and cellulose acetate propionate. Among these resin materials, polyethylene terephthalate is preferable from the viewpoints of transparency, flexibility, contamination resistance, strength and the like.

Examples of paper that can be used include wood-free paper and coated paper.

The thickness of the base material is preferably 10 µm to 500 µm and more preferably 20 µm to 200 µm. The aforementioned thickness indicates a value measured in accordance with a known method such as JIS K 7136, JIS K 6783, JIS C 2151, and JIS Z 1702.

<Production Method of Antistatic Release Base Material>

An example of a method for producing the antistatic release base material comprises a step for coating and drying the aforementioned antistatic release coated film onto at least one side of a base material. The same methods used when coating the antistatic release agent during formation of the previously described antistatic release coated film can be applied as coating methods.

In addition, although there are no particular limitations on the thickness of the antistatic release coated film (thickness after drying) provided the effects of the present invention are demonstrated, it is preferably 0.001 µm to 1 µm, and more preferably 0.1 µm to 0.5 µm, from the viewpoint of transparency. The aforementioned coated film thickness indicates a value measured using Scanning Electron Microscope (SEM), Transmission Electron Microscope (TEM), analysis by simulation and actual measurement using X-ray and various wave length, and stylus based measurement.

The antistatic release base material of the present invention has both superior antistatic properties and release property as a result of being provided with an antistatic release coated film composed of the aforementioned antistatic release agent. Consequently, the antistatic release base material of the present invention is preferably used for a pressure-sensitive adhesive sheet for use in optical applications and electrical and electronic components.

EXAMPLES

Although the following indicates examples and comparative examples of the present invention, the present invention is not limited to the following examples.

The pH in each of the following examples was measured with a commercially available pH meter (F-22 pH Meter, Horiba Corp.) in a thermostatic chamber at 25° C. The pH meter was calibrated using a phthalic acid pH standard solution (pH 4.01), neutral phosphate pH standard solution (pH 6.86) and borate pH standard solution (pH 9.18) manufactured by Kanto Chemical Co., Ltd.

Production Example 1

Preparation of Polystyrene Sulfonate 206 g of sodium styrene sulfonate were dissolved in 1000 ml of ion exchange water followed by dropping in a solution of 1.14 g of ammonium persulfate preliminarily dissolved in 10 ml of water while stirring at 80° C., and further stirring the solution for 2 hours.

1000 ml of sulfuric acid diluted to 10% by weight and 10,000 ml of ion exchange water were added to the resulting sodium styrene sulfonate-containing solution. Subsequently, about 10,000 ml of polystyrene sulfonate-containing solution were removed using ultrafiltration. Moreover, 10,000 ml of ion exchange water were added to the residual liquid, and about 10,000 ml of solution were removed using ultrafiltration. The aforementioned ultrafiltration procedure was repeated three times and the water in the resulting solution was removed under reduced pressure to obtain polystyrene sulfonate in the form of a colorless solid. The weight average molecular weight of this polystyrene sulfonate was about 250,000.

In addition, the conditions used during ultrafiltration were as indicated below (and apply similarly in other examples as well).

Molecular weight cutoff of ultrafiltration membrane: 30,000
Cross-flow system
Feed liquid flow rate: 3,000 ml/min
Membrane partial pressure: 0.12 Pa Production Example 2

Preparation of Aqueous Solution of Electrically Conductive Polymer Complex

Preparation of Aqueous Dispersion of Polystyrene Sulfonate-Doped Poly(3,4-Ethylenedioxythiophene)

14.2 g of 3,4-ethylenedioxythiophene and a solution obtained by dissolving 36.7 g of the polystyrene sulfonate obtained in Production Example 1 in 2,000 ml of ion exchange water were mixed at 20° C.

While holding at 20° C., 29.64 g of ammonium persulfate and a solution obtained by dissolving 8.0 g of an oxidation catalyst in the form of ferric sulfate in 200 ml of ion exchange water were slowly added to the resulting mixed solution while stirring. The reaction was allowed to proceed for 3 hours following completion of addition.

2000 ml of ion exchange water were added to the resulting reaction liquid and about 2,000 ml of the solution were removed using ultrafiltration. This procedure was repeated three times.

Next, 200 ml of dilute sulfuric acid having a concentration of 10% by weight and 2,000 ml of ion exchange water were added to the treated liquid on which the aforementioned ultrafiltration was carried out, and about 2,000 ml of the treated liquid were removed using ultrafiltration. Subsequently, 2,000 ml of ion exchange water were further added to the solution following treatment, and about 2000 ml of liquid were removed using ultrafiltration. This procedure was repeated three times.

Moreover, 2,000 ml of ion exchange water were added to the resulting treated liquid and about 2,000 ml of the treated liquid were removed using ultrafiltration. This procedure was repeated five times to obtain an aqueous dispersion of about 1.2% by weight of blue polystyrene sulfonate-doped poly(3,4-ethylenedioxythiophene) (PEDOT-PSS).

(Measurement Method of Neutralization Equivalent of PEDOT-PSS Aqueous Dispersion)

The neutralization equivalent of the PEDOT-PSS aqueous dispersion in each of the following examples was determined in the manner described below.

Namely, the PEDOT-PSS aqueous dispersion obtained according to Production Example 2 was titrated to neutrality with alkaline compounds used in each of the following examples, and the amount of alkaline compound added at that time was determined as the neutralization equivalent by defining the inflection point on the titration curve to be the point of neutralization.

Example 1

2.7 g of an 8.4% by weight aqueous sodium bicarbonate solution (0.72 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 2.26.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 2

3.47 g of an 8.4% by weight aqueous sodium bicarbonate solution (0.93 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 3.00.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 3

3.72 g of an 8.4% by weight aqueous sodium bicarbonate solution (1.00 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 4.22.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 4

4.1 g of an 8.4% by weight aqueous sodium bicarbonate solution (1.10 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 5.58.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 5

5.6 g of an 8.4% by weight aqueous sodium bicarbonate solution (1.51 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 6.45.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 6

7.8 g of an 8.4% by weight aqueous sodium bicarbonate solution (2.10 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 6.93.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 7

0.24 g of a 28% by weight aqueous ammonia solution (0.73 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 2.28.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 8

0.31 g of a 28% by weight aqueous ammonia solution (0.94 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 3.05.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 9

0.33 g of a 28% by weight aqueous ammonia solution (1.00 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 5.76.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 10

0.4 g of a 28% by weight aqueous ammonia solution (1.21 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 8.94.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 11

0.5 g of a 28% by weight aqueous ammonia solution (1.52 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 9.40.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 12

0.7 g of a 28% by weight aqueous ammonia solution (2.12 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 9.78.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 13

2.9 g of a 4% by weight aqueous sodium hydroxide solution (0.72 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 2.29.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 14

3.7 g of a 4% by weight aqueous sodium hydroxide solution (0.91 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 2.95.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 15

4.0 g of a 4% by weight aqueous sodium hydroxide solution (1.00 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 7.00.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 16

4.1 g of a 4% by weight aqueous sodium hydroxide solution (1.02 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 9.86.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 17

26 g of a 6.8% by weight aqueous imidazole solution (0.72 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 2.12.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 18

33 g of a 6.8% by weight aqueous imidazole solution (0.92 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 2.84.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 19

36 g of a 6.8% by weight aqueous imidazole solution (1.00 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 4.32.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 20

43 g of a 6.8% by weight aqueous imidazole solution (1.19 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 6.70.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Example 21

0.67 g of triethylamine (0.96 times relative to the number of moles of the neutralization equivalent of the PEDOT-PSS aqueous dispersion obtained according to Production Example 2) was added to 100 g of the PEDOT-PSS aqueous dispersion to obtain an aqueous sodium salt solution of PEDOT-PSS. When the pH of this aqueous solution was measured, it was found to be 3.62.

The aqueous triethylamine salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Comparative Example 1

100 g of a silicone emulsion (X-52-6068, Shin-Etsu Chemical Co., Ltd.) (containing 4% by weight of electrically conductive polymer complex to 100% by weight of the solid component of the silicone emulsion) and 20 g of dimethylsulfoxide were added to 100 g of the PEDOT-PSS aqueous dispersion obtained according to Production Example 2 followed by stirring to obtain an antistatic release agent. When the pH of the resulting antistatic release agent was measured, it was found to be 1.60.

Comparative Example 2

1.3 g of an 8.4% by weight aqueous sodium bicarbonate solution (0.35 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 1.82.

The aqueous salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Comparative Example 3

2.3 g of an 8.4% by weight aqueous sodium bicarbonate solution (0.62 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 2.07.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Comparative Example 4

0.18 g of a 28% by weight aqueous ammonia solution (0.55 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 2.0.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Comparative Example 5

1.1 g of a 28% by weight aqueous ammonia solution (3.33 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 10.1.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Comparative Example 6

2.2 g of a 4% by weight aqueous sodium hydroxide solution (0.54 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 2.00.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Comparative Example 7

4.4 g of a 4% by weight aqueous sodium hydroxide solution (1.09 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 11.35.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Comparative Example 8

8 g of a 6.8% by weight aqueous imidazole solution (0.22 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 1.74.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

Comparative Example 9

15 g of a 6.8% by weight aqueous imidazole solution (0.42 times relative to the number of moles of the neutralization equivalent of the PEDOT-PSS aqueous dispersion obtained according to Production Example 2) were added to 100 g of the PEDOT-PSS aqueous dispersion to obtain an aqueous sodium salt solution of PEDOT-PSS. When the pH of this aqueous solution was measured, it was found to be 1.85.

The aqueous sodium salt solution of PEDOT-PSS (containing 3% by weight of electrically conductive polymer complex to 100% by weight of the solid component of a silicone emulsion (X-52-6068, Shin-Etsu Chemical Co., Ltd.)) and 20 g of dimethylsulfoxide were added to 100 g of the silicone emulsion followed by stirring to obtain an antistatic release agent.

<Evaluation>

Storage stability of the antistatic release agent of each example was evaluated according to the method described below. The evaluation results are shown in Tables 1 to 5.

80 ml of a prepared antistatic release agent were filled into a 100 ml glass storage vessel. This storage vessel was stored in an environment at 40° C. followed by visually observing the state thereof after 1 week, 2 weeks and 3 weeks. In addition, the aforementioned antistatic release agent was coated onto a polyethylene terephthalate film (A4300, Toyobo Co., Ltd., thickness: 188 μm) with a #4 bar coater to form an antistatic release coated film, and the aforementioned coated film was observed visually.

Evaluations were carried out based on the criteria indicated below.

A: No precipitate in release agent and no abnormalities observed in coated film, thereby demonstrating superior storage stability B: Slight amount of precipitate in release agent, but no abnormalities observed in coated film, thereby demonstrating favorable storage stability.

C: Precipitate formed in release agent and cissing was observed in the coated film, thereby demonstrating low storage stability.

TABLE 1

|  |  | Examples |  |  |  |  |  | Comparative Examples |  |  |
|---|---|---|---|---|---|---|---|---|---|---|
|  |  | 1 | 2 | 3 | 4 | 5 | 6 | 1 | 2 | 3 |
| PEDOT-PSS aqueous dispersion | g | 100 | | | | | | 100 | | |
| Alkaline compound | | Sodium bicarbonate | | | | | | None | Sodium bicarbonate | |
| Neutralization equivalent | Times | 0.72 | 0.93 | 1.00 | 1.10 | 1.51 | 2.10 | 0.00 | 0.35 | 0.62 |
| pH | | 2.26 | 3.00 | 4.22 | 5.58 | 6.45 | 6.93 | 1.60 | 1.82 | 2.07 |
| Silicone emulsion | g | 100 | | | | | | | | |
| Storage stability | 1 wk | A | A | A | A | A | A | C | B | B |
|  | 2 wk | A | A | A | A | A | A | — | C | C |
|  | 3 wk | B | A | A | A | B | B | — | — | — |

TABLE 2

|  |  | Examples |  |  |  |  |  | Comparative Examples |  |
|---|---|---|---|---|---|---|---|---|---|
|  |  | 7 | 8 | 9 | 10 | 11 | 12 | 4 | 5 |
| PEDOT-PSS aqueous dispersion | g | 100 | | | | | | | |
| Alkaline compound | | Aqueous ammonia | | | | | | | |
| Neutralization equivalent | Times | 0.73 | 0.94 | 1.00 | 1.21 | 1.52 | 2.12 | 0.55 | 3.33 |

TABLE 2-continued

|  |  | Examples | | | | | | Comparative Examples | |
|---|---|---|---|---|---|---|---|---|---|
|  |  | 7 | 8 | 9 | 10 | 11 | 12 | 4 | 5 |
| pH |  | 2.28 | 3.05 | 5.76 | 8.94 | 9.40 | 9.78 | 2.00 | 10.10 |
| Silicone emulsion | g |  |  |  | 100 |  |  |  |  |
| Storage stability | 1 wk | A | A | A | A | A | A | B | C |
|  | 2 wk | A | A | A | A | A | A | C | — |
|  | 3 wk | B | A | A | B | B | B | — | — |

TABLE 3

|  |  | Examples | | | | Comparative Examples | |
|---|---|---|---|---|---|---|---|
|  |  | 13 | 14 | 15 | 16 | 6 | 7 |
| PEDOT-PSS aqueous dispersion | g |  |  | 100 | | | |
| Alkaline compound |  |  | Sodium hydroxide | | | | |
| Neutralization equivalent | Times | 0.72 | 0.91 | 1.00 | 1.02 | 0.54 | 1.09 |
| pH |  | 2.29 | 2.95 | 7.00 | 9.86 | 2.00 | 11.35 |
| Silicone emulsion | g |  |  | 100 | | | |
| Storage stability | 1 wk | A | A | A | A | B | C |
|  | 2 wk | A | A | A | A | C | — |
|  | 3 wk | A | A | B | B | — | — |

TABLE 4

|  |  | Examples | | | | Comparative Examples | |
|---|---|---|---|---|---|---|---|
|  |  | 17 | 18 | 19 | 20 | 8 | 9 |
| PEDOT-PSS aqueous dispersion | g |  |  | 100 | | | |
| Alkaline compound |  |  | Imidazole | | | | |
| Neutralization equivalent | Times | 0.72 | 0.92 | 1.00 | 1.19 | 0.22 | 0.42 |
| PH |  | 2.12 | 2.84 | 4.32 | 6.70 | 1.74 | 1.85 |
| Silicone emulsion | g |  |  | 100 | | | |
| Storage stability | 1 wk | A | A | A | A | B | B |
|  | 2 wk | A | A | A | A | C | C |
|  | 3 wk | A | A | A | B | — | — |

TABLE 5

|  |  | Example 21 |
|---|---|---|
| PEDOT-PSS aqueous dispersion | g | 100 |
| Alkaline compound |  | Triethylamine |
| Neutralization equivalent | Times | 0.96 |
| pH |  | 3.62 |
| Silicone emulsion | g | 100 |
| Storage stability | 1 wk | A |
|  | 2 wk | A |
|  | 3 wk | A |

The antistatic release agents of Examples 1 to 21 demonstrated superior storage stability.

In contrast, the release agent of Comparative Example 1 that does not contain an alkaline compound, the release agents of Comparative Examples 2 to 4, 6, 8 and 9, in which the content of the alkaline compound is less than 0.7 times relative to the number of moles of the neutralization equivalent of PEDOT-PSS, and the release agents of Comparative Examples 5 and 7, in which the pH of antistatic release agent is 10 or more, all demonstrated inadequate storage stability.

INDUSTRIAL APPLICABILITY

The present invention is able to provide an antistatic release agent having superior storage stability, an antistatic release coated film formed by coating the aforementioned antistatic release agent, and an antistatic release base material containing the aforementioned antistatic release coated film.

BRIEF DESCRIPTION OF THE REFERENCE SYMBOLS

10 Antistatic release base material
11 Base material
12 Antistatic release coated film

The invention claimed is:

1. An antistatic release agent, comprising: an aqueous solution of an electrically conductive polymer complex composed of a t-conjugated electrically conductive polymer and a polyanion having an anionic group in a molecule thereof, an alkaline compound, a silicone emulsion and a dispersion medium; wherein,
    the alkaline compound is at least one type of compound selected from the group consisting of an inorganic alkali, an amine compound and a nitrogen-containing aromatic cyclic compound,
    the inorganic alkali is selected from the group consisting of sodium hydroxide, potassium hydroxide, calcium hydroxide, ammonia, sodium bicarbonate, potassium bicarbonate and ammonium bicarbonate,
    the content of the alkaline compound in the antistatic release agent is 0.7 times or more relative to the number of moles of the neutralization equivalent of the electrically conductive polymer complex, and
    the pH of the antistatic release agent at 25° C. is 10 or lower.

2. The antistatic release agent according to claim 1, wherein the silicone emulsion contains an addition reaction-type silicone resin.

3. An antistatic release coated film formed by coating the antistatic release agent according to claim 1.

4. An antistatic release base material having a base material and the antistatic release coated film according to claim 3, wherein the antistatic release coated film is laminated on the base material.

5. The antistatic release agent according to claim 1, wherein the inorganic alkali is selected from the group consisting of potassium hydroxide, calcium hydroxide, ammonia, sodium bicarbonate, potassium bicarbonate and ammonium bicarbonate.

6. The antistatic release agent according to claim 1, wherein the alkaline compound is at least one type of compound selected from the group consisting of an amine compound and a nitrogen-containing aromatic cyclic compound.

* * * * *